(12) United States Patent
Noack et al.

(10) Patent No.: US 9,814,174 B2
(45) Date of Patent: Nov. 14, 2017

(54) AIR FILTRATION MODULE FOR COATED SEED PLANTERS

(71) Applicant: JPS Ag, LLC, St. Louis Park, MN (US)

(72) Inventors: Jeffrey David Noack, Eden Prairie, MN (US); Peter James Rupert, North Oaks, MN (US); Stephen Gerard May, St. Louis Park, MN (US)

(73) Assignee: JPS Ag, LLC, St. Louis Park, MN (US)

( * ) Notice: Subject to any disclaimer, the term of this patent is extended or adjusted under 35 U.S.C. 154(b) by 53 days.

(21) Appl. No.: 14/720,409

(22) Filed: May 22, 2015

(65) Prior Publication Data

US 2015/0250095 A1   Sep. 10, 2015

Related U.S. Application Data

(63) Continuation-in-part of application No. 14/273,101, filed on May 8, 2014, now abandoned.

(60) Provisional application No. 61/835,868, filed on Jun. 17, 2013.

(51) Int. Cl.
| | |
|---|---|
| *A01C 7/08* | (2006.01) |
| *A01C 15/00* | (2006.01) |
| *B01D 46/00* | (2006.01) |
| *B01D 46/10* | (2006.01) |

(52) U.S. Cl.
CPC ............ *A01C 7/081* (2013.01); *A01C 15/006* (2013.01); *B01D 46/0002* (2013.01); *B01D 46/10* (2013.01)

(58) Field of Classification Search
CPC .......... A01C 7/081; A01C 7/20; B01D 45/08; B01D 46/0002; B01D 46/0005; B01D 46/521; B01D 46/528; B01D 50/00; B01D 25/00; F02M 35/024
USPC .................... 55/385.1, 385.3, 480, 481, 495; 123/198 E; 111/184
See application file for complete search history.

(56) References Cited

U.S. PATENT DOCUMENTS

| | | | |
|---|---|---|---|
| 4,917,202 A | 4/1990 | Glover, Jr. et al. | |
| 6,030,427 A * | 2/2000 | Sorice ............... | B01D 46/0004 55/480 |
| 6,533,835 B2 * | 3/2003 | Wilson .............. | B01D 46/0002 55/385.1 |
| 6,623,540 B2 * | 9/2003 | Hodge .............. | B01D 46/0005 55/480 |
| 6,793,703 B1 | 9/2004 | Sledge et al. | |
| 7,364,602 B2 | 4/2008 | Wu et al. | |
| 7,524,362 B2 | 4/2009 | Wu et al. | |
| 7,588,619 B2 * | 9/2009 | Chilton ............. | B01D 46/528 55/385.3 |
| 8,066,788 B2 * | 11/2011 | Kobayashi ....... | F01P 1/02 123/198 E |

(Continued)

*Primary Examiner* — Duane Smith
*Assistant Examiner* — Minh-Chau Pham
(74) *Attorney, Agent, or Firm* — Skaar Ulbrich Macari, P.A.

(57) ABSTRACT

Disclosed is an air filtration module for seed planters. The filtration module includes a filter cartridge with a filter media disposed therein. The cartridge is sized and shaped to fit into the stock seed hopper. The filter media is configured to filter out and contain particles of seed coating materials that contain neonicotinoids and/or other airborne contaminants. The filter cartridge can replace the porous seed container wall through which compressed air is discharged out the seed hopper air discharge vent.

19 Claims, 13 Drawing Sheets

(56) References Cited

U.S. PATENT DOCUMENTS

| | | |
|---|---|---|
| 8,157,882 B2 | 4/2012 | Curtis et al. |
| 8,293,170 B1 * | 10/2012 | Schuld .............. B01D 46/0005 239/60 |
| 2002/0069624 A1 | 6/2002 | Jaramillo et al. |
| 2014/0274682 A1 | 9/2014 | Wu et al. |
| 2014/0366497 A1 | 12/2014 | Noack et al. |

* cited by examiner

AIR FILTRATION MODULE FOR COATED SEED PLANTERS

This application is a continuation in part of U.S. patent application Ser. No. 14/273,101, filed on May 8, 2014, now abandoned, which claims the priority benefit of U.S. Provisional Application No. 61/835,868, filed on Jun. 17, 2013, and both of which are hereby incorporated herein by reference in their entirety.

PRIORITY

This application is a continuation in part of U.S. patent application Ser. No. 14/273,101, filed on May 8, 2014, which claims the priority benefit of U.S. Provisional Application No. 61/835,868, filed on Jun. 17, 2013, and both of which are hereby incorporated herein by reference in their entirety.

FIELD

The invention relates to the planting of coated seeds, and more particularly to, filtering and containment of particulates that rub off insecticide-treated seeds that become airborne when discharged from an agricultural production planting unit such as a seed planter.

BACKGROUND

In the past, insecticides and other chemicals were applied by foliar and ground application on top of the soil. This method of application resulted in the expensive insecticides, herbicides and fungicides which exposed farmers to hazardous chemicals, and encouraged over application. Certain compounds became airborne and detrimental to the habitat, including beneficial insects, like bees, that are needed to pollinate corn, soybeans and other agriculturally grown food products.

More recently, over 90% of the corn and 80% of the seeds planted to grow soybeans are being directly treated with a coating of insecticide and fungicide that extend the time that the seeds can be in the ground before insects and fungus keeps them from germinating. One common component of these conventional seed chemical coatings is a neonicotinoid insecticide.

These current seed coating products have reduced the amount of crop protection products that need to be spray applied to a crop. In addition, this has reduced the amount of labor that is needed which has encouraged aggressive growers to farm more land. Seed coating treatments have increased soybean and corn yields, reduced costs and produced more abundant and cheaper food.

There is now a belief by some that the neonicotinoids in the current widely used seed coatings are causing bee colony collapse disorder when the coating chemical compounds form particulates and become airborne during the planting process due to the utilization of forced air to move the seeds through the planting apparatus. This is an important concern since bees are necessary to pollinate many crops. The European Union became so concerned about the detrimental effects of neonicotinoid insecticide particulates becoming airborne that they have enacted a 2 year ban on seed treatment products that contain three pesticides belonging to the neonicotinoids family (clothianidin, imidacloprid and thiametoxam).

FIGS. 1 through 4 illustrate a conventional wheeled seed planter apparatus 10. Coated seeds are usually loaded into a bulk seed tank. From the main bulk seed tank the seed is forced by air through a series of flexible tubes before it enters the seed hopper box 12. The seed hopper box 12 also includes a cover 14. A compressed air discharge head 16 is coupled to the hopper box 12. Seed is moved from the bulk seed tank to the seed hopper box 12 via the compressed air discharge head 16. A porous seed container wall or screen 18 is disposed inside of the main hopper 12 to allow the compressed air to move through the bulk seed tank and vibrate the seeds in the seed hopper box 12 forward to the seed tube and discharge chute 24. The compressed air discharge chute 20 portion of the seed hopper 12 allows the forced air to escape. A planter may have multiple laterally-disposed seed hoppers 12 for planting several rows of seeds at one time.

Figure 1:
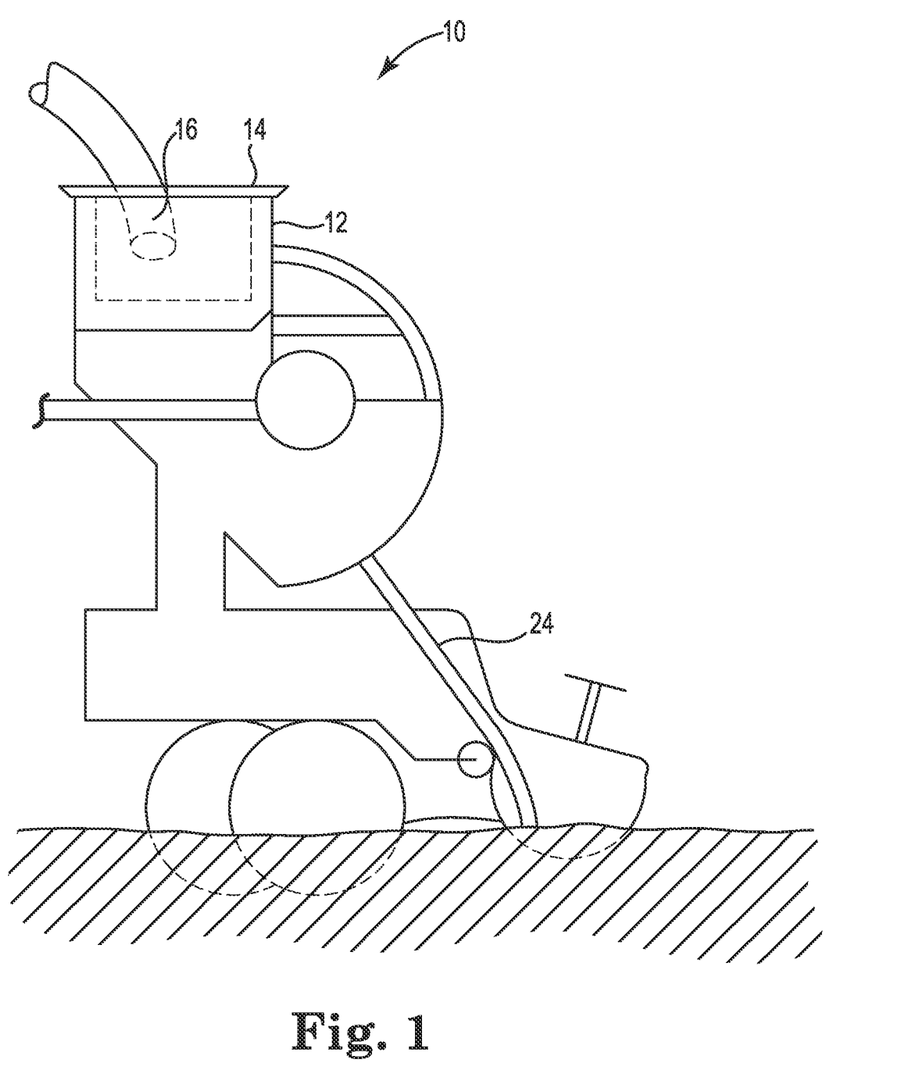
FIG. 1 is a side view of a conventional wheeled seed planter showing certain details thereof.
Figure 2:
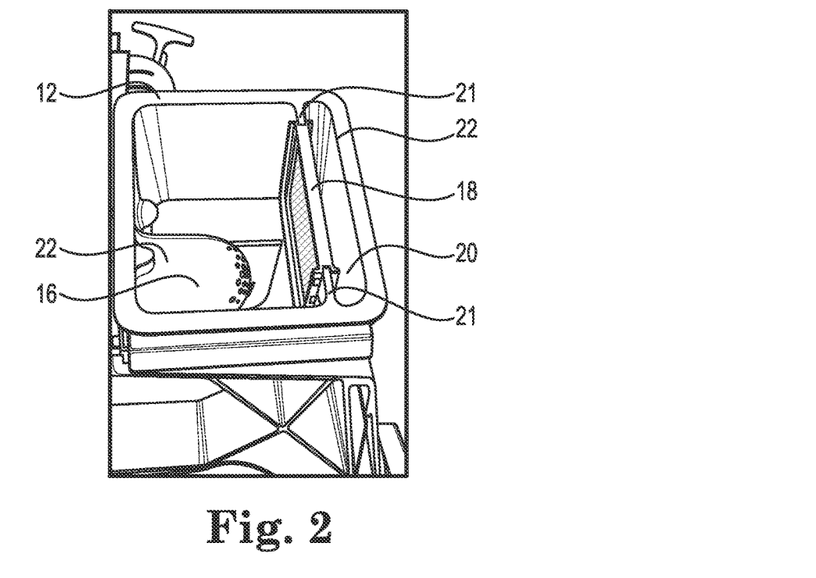
FIG. 2 is a perspective view of an opened seed box showing the hopper air discharge chute contaminated with seed coating particulates that have vibrated off the seeds.
Figure 3:
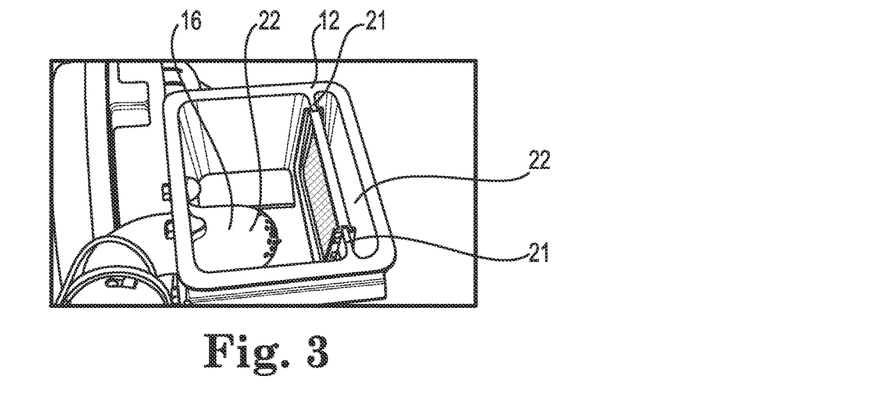
FIG. 3 is another perspective view of an opened seed box showing the hopper air discharge vent contaminated with seed coating particulates that have vibrated off the seeds.
Figure 4:
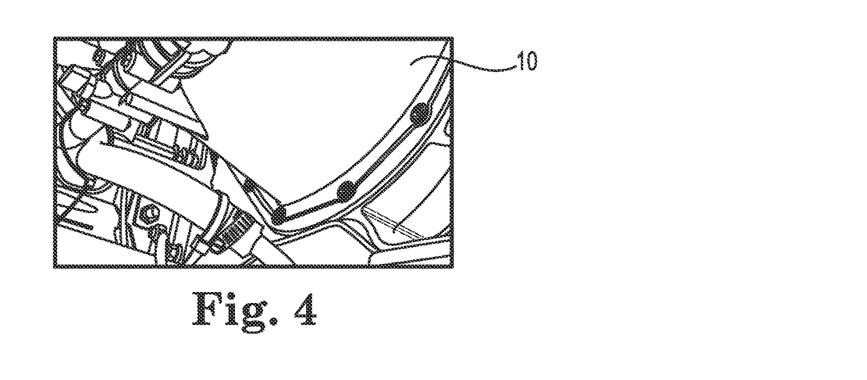
FIG. 4 is a perspective view of the underside of the seed hopper showing contamination with seed coating particulates that have vibrated off the seeds.
Figure 5:
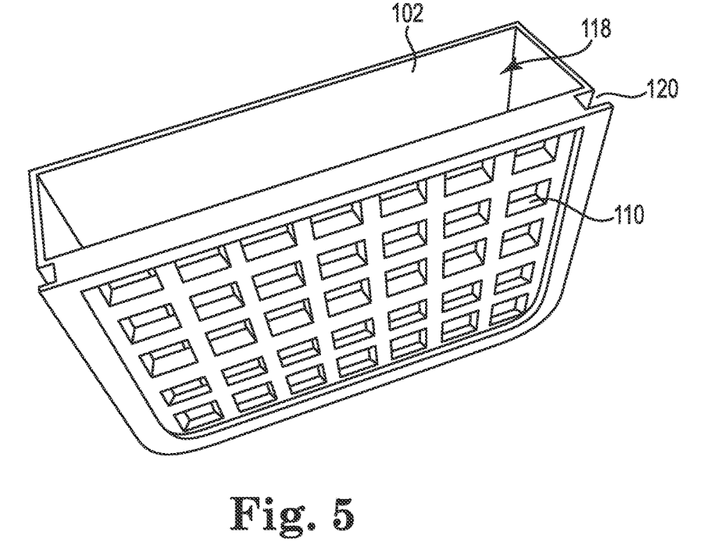
FIG. 5 is a perspective view of a filter cartridge according to certain embodiments.
Figure 6:
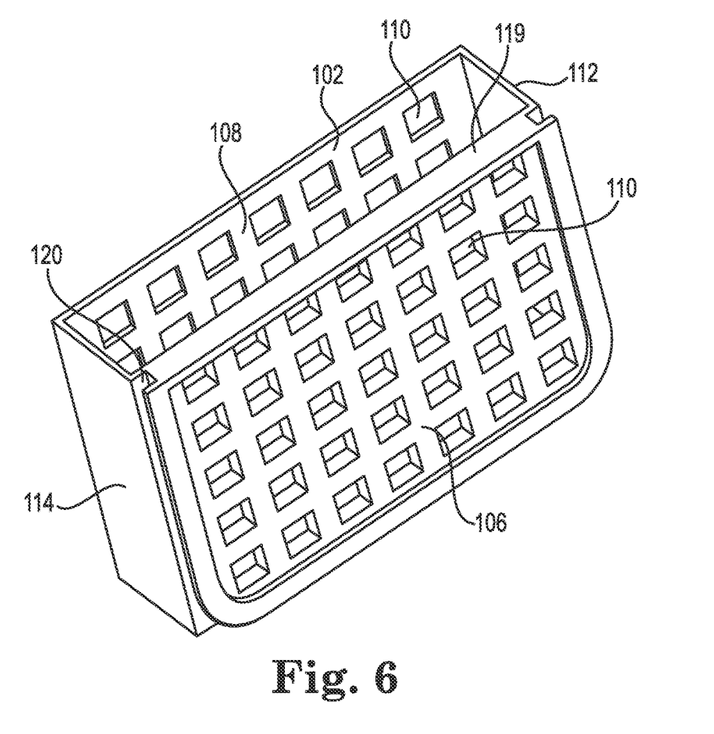
FIG. 6 is another perspective view of a filter cartridge according to certain embodiments.
Figure 7A:
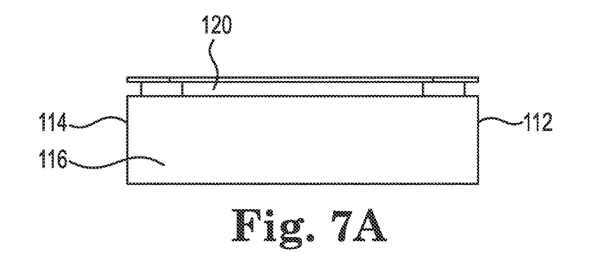
FIG. 7A is a bottom view of a filter cartridge according to certain embodiments.
Figure 7B:
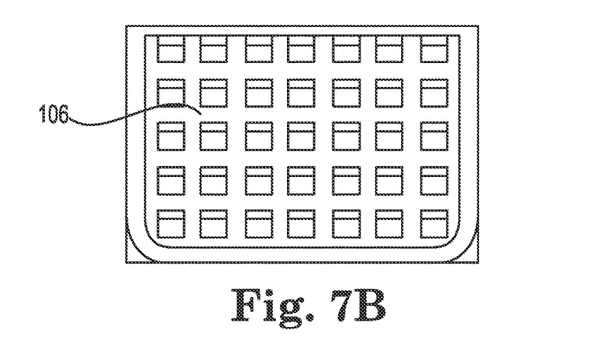
FIG. 7B is a front view of a filter cartridge according to certain embodiments.
Figure 7C:
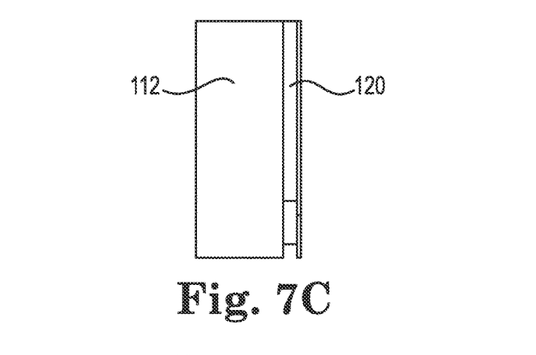
FIG. 7C is a side view of a filter cartridge according to certain embodiments.
Figure 7D:
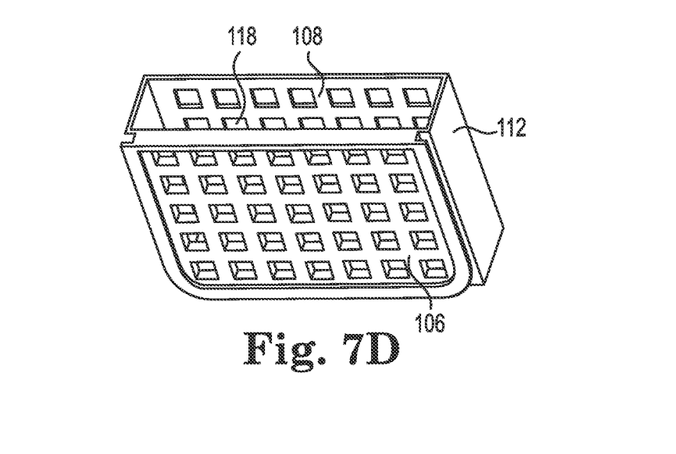
FIG. 7D is a perspective view of a filter cartridge according to certain embodiments.
Figure 8:
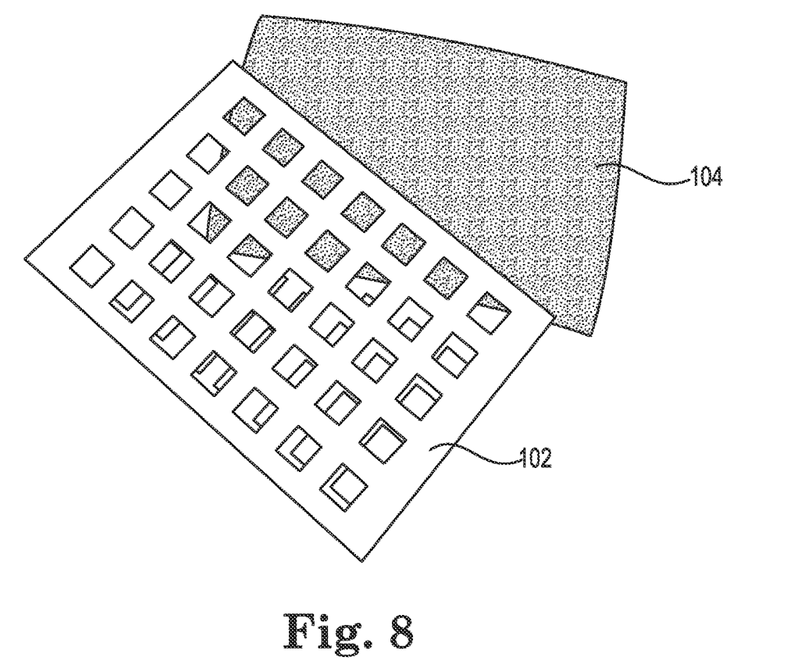
FIG. 8 is a perspective view of a filter cartridge with a filter media partially inserted into the cartridge according to certain embodiments.
Figure 9:
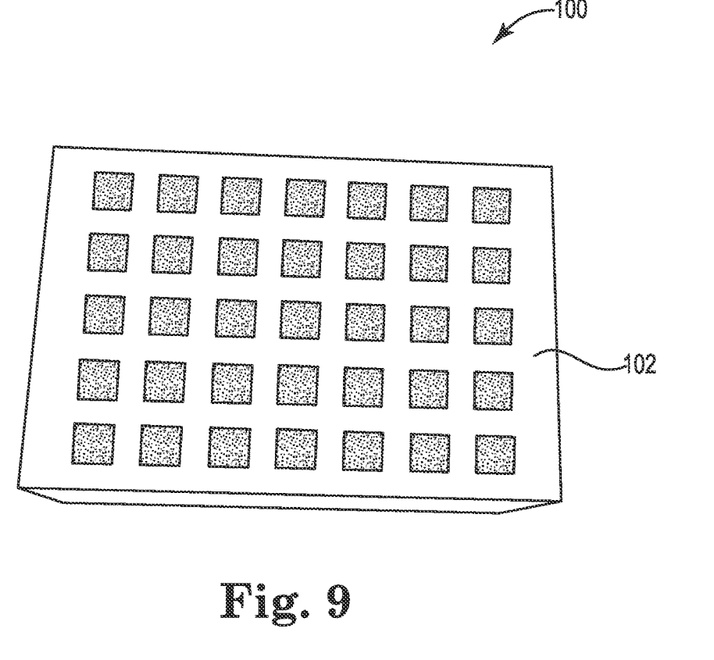
FIG. 9 is another perspective view of a filter cartridge with a filter media partially inserted into the cartridge according to certain embodiments.
Figure 10:
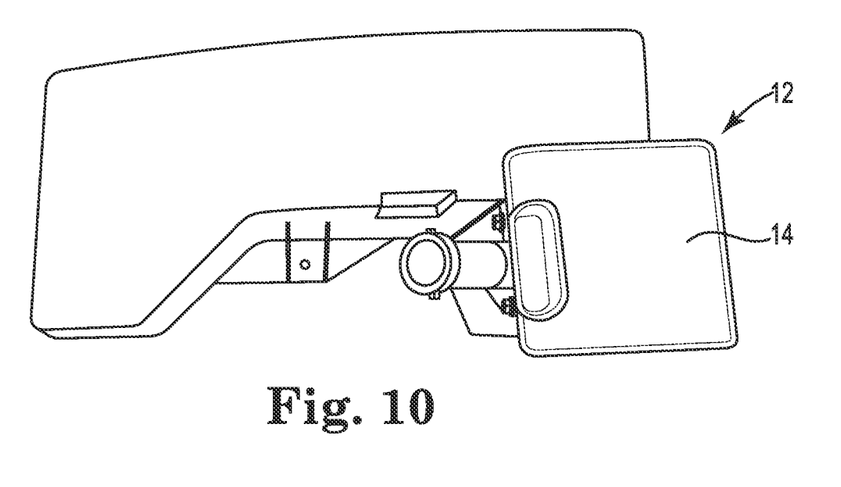
FIG. 10 is a top view of a conventional seed hopper.
Figure 11:
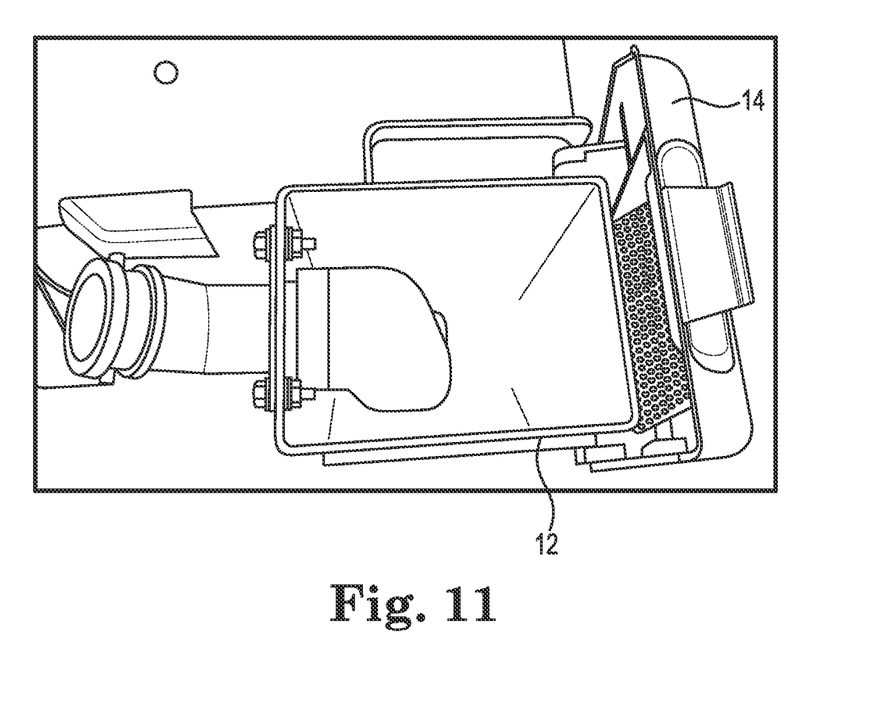
FIG. 11 is a top view of the seed hopper of FIG. 10 with the top cover removed.
Figure 12:
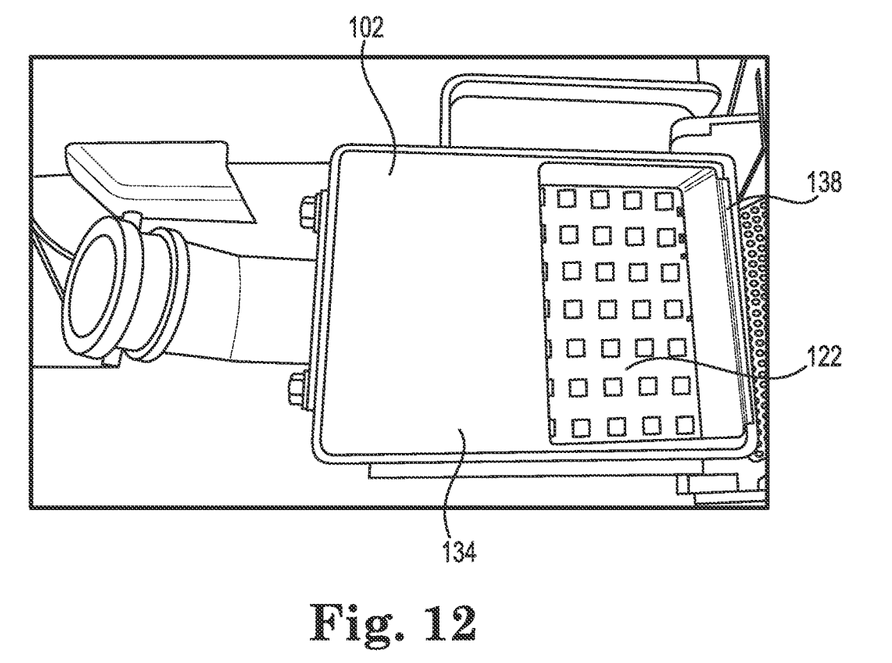
FIG. 12 is a top view of the seed hopper with top cover removed of FIG. 11 with a filter cartridge disposed in the hopper according to certain embodiments.
Figure 13:
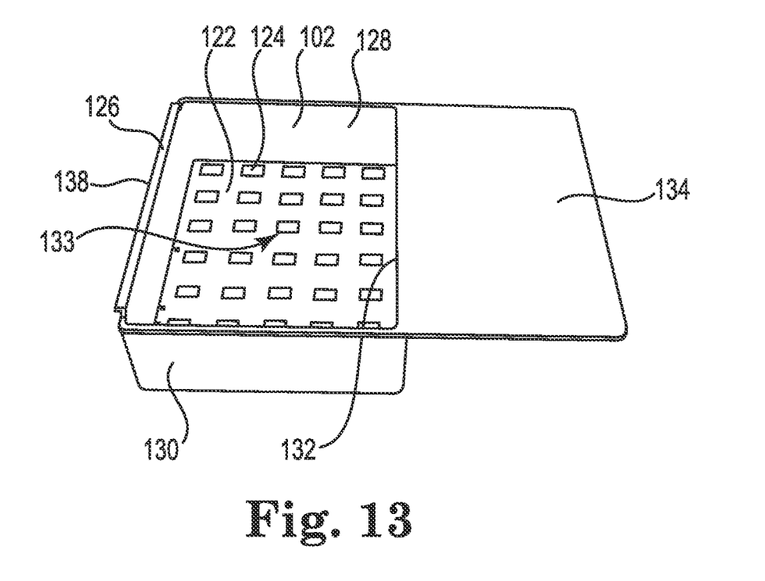
FIG. 13 is a perspective view of a filter cartridge according to certain embodiments.
Figure 14:
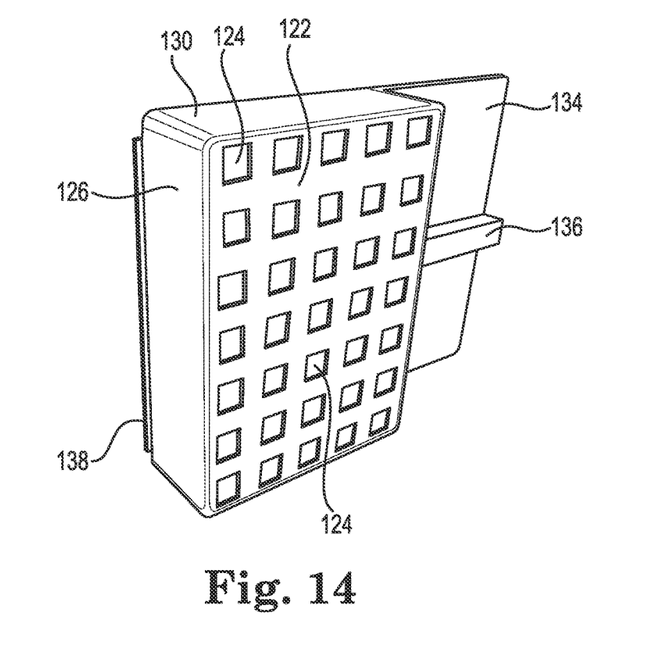
FIG. 14 is another perspective view of a filter cartridge according to certain embodiments.
Figure 15:
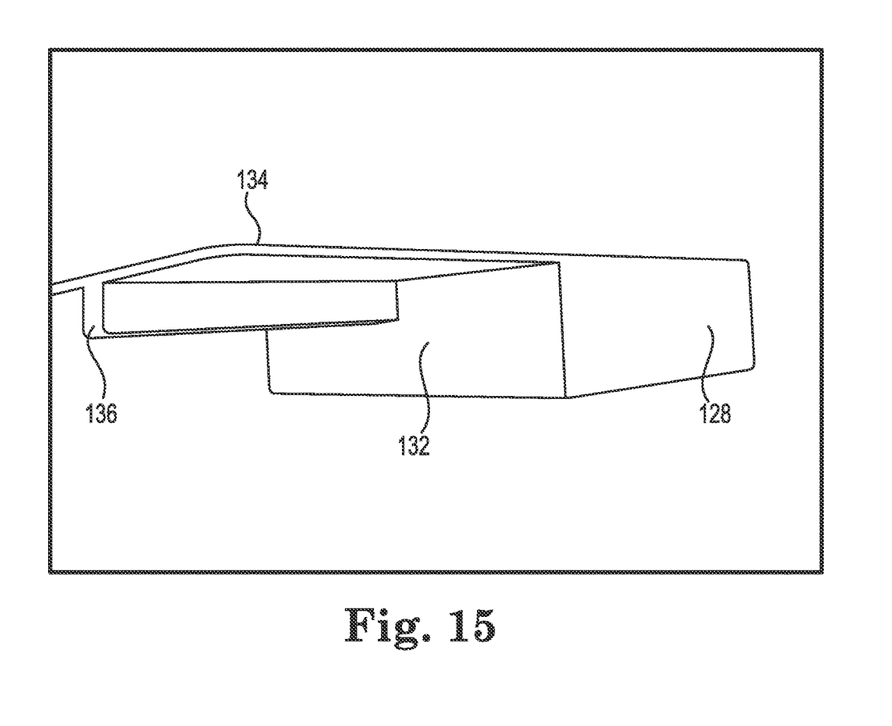
FIG. 15 is a further perspective view of a filter cartridge according to certain embodiments.
Figure 16:
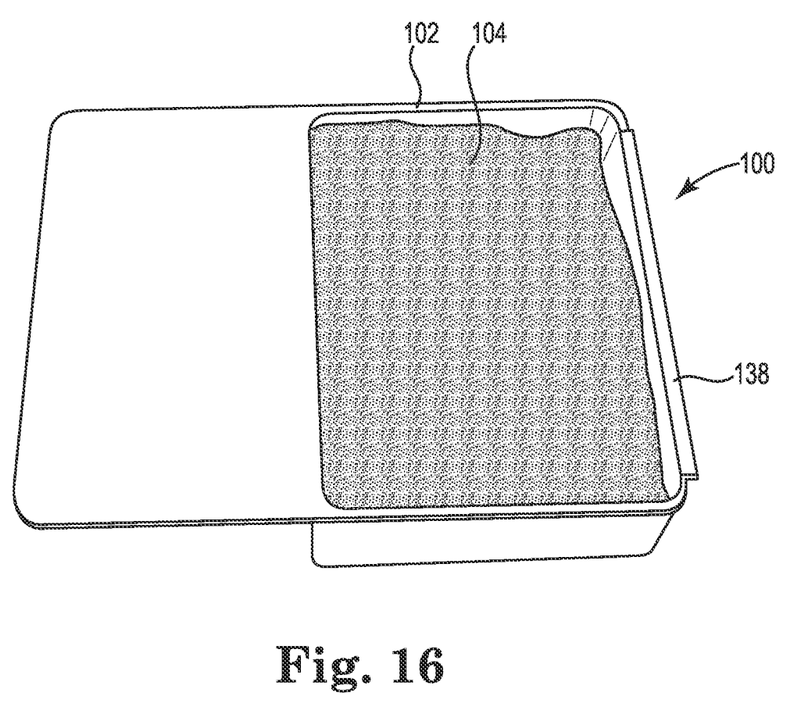
FIG. 16 is a perspective view of a filter cartridge with filter media disposed therein according to certain embodiments.
Figure 17:
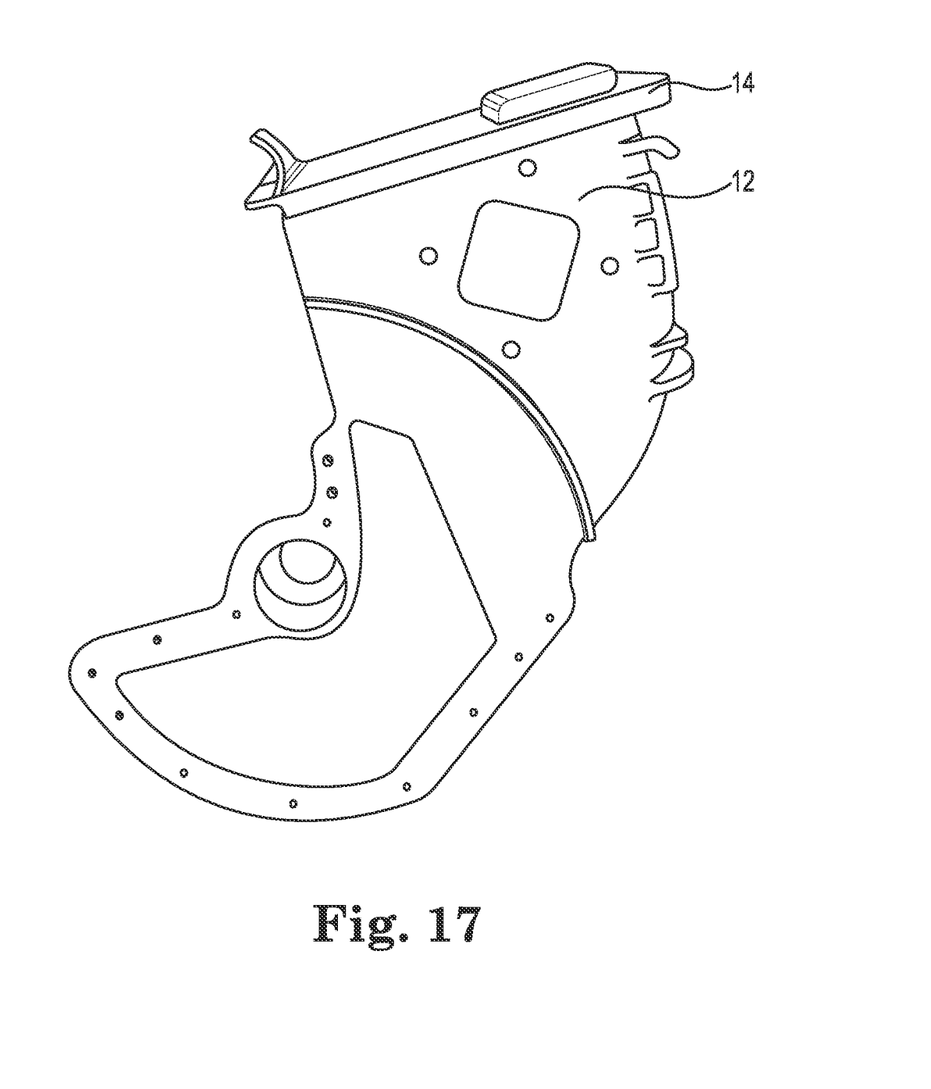
FIG. 17 is a side view of a conventional seed hopper.
Figure 18:
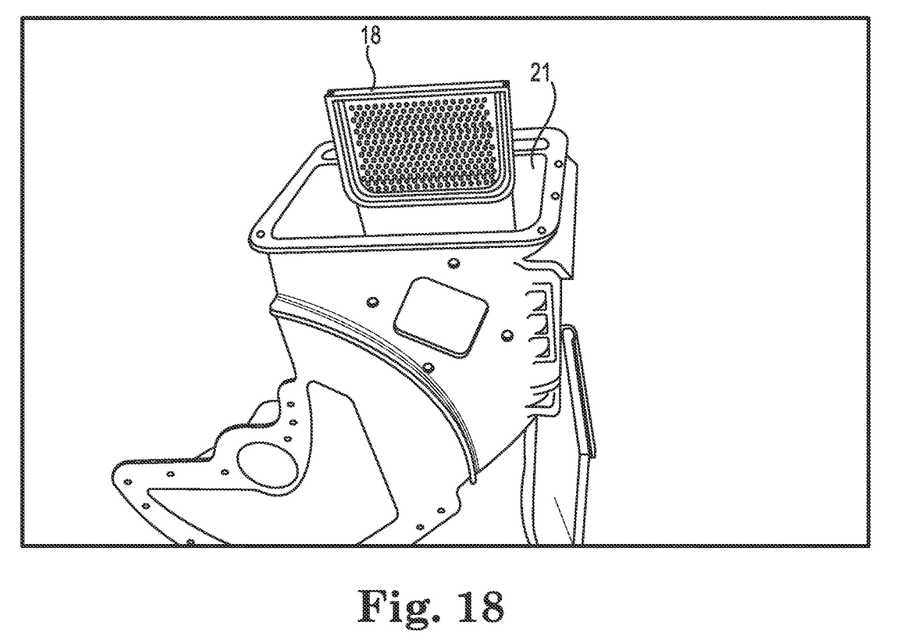
FIG. 18 is a perspective view of the seed hopper of FIG. 17 with the top cover removed and the separator screen partially removed.
Figure 19:
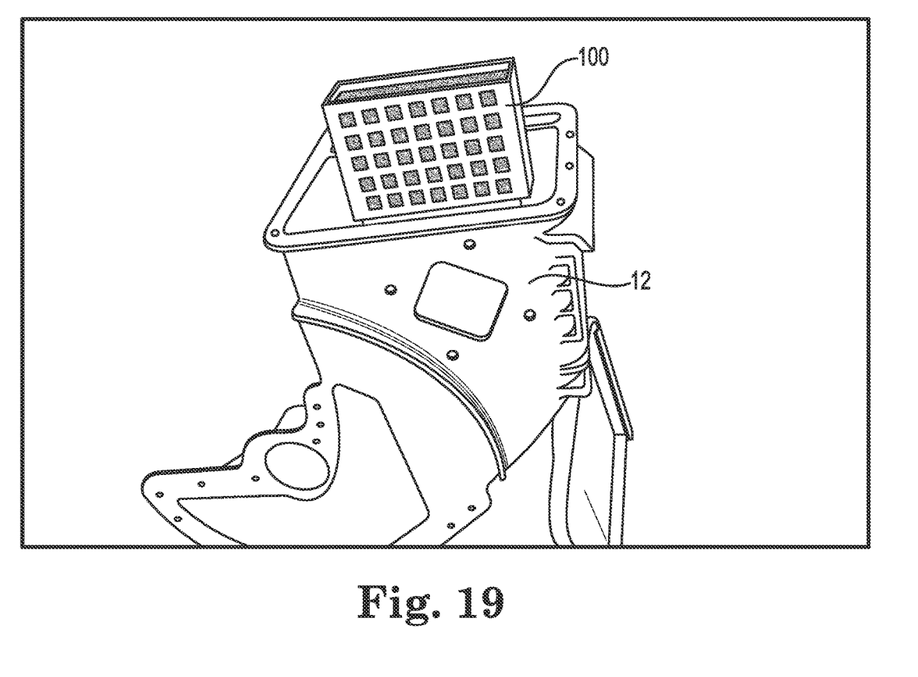
FIG. 19 is a perspective view of the seed hopper of FIG. 18 with a filter cartridge partially disposed in the hopper according to certain embodiments.
Figure 20:
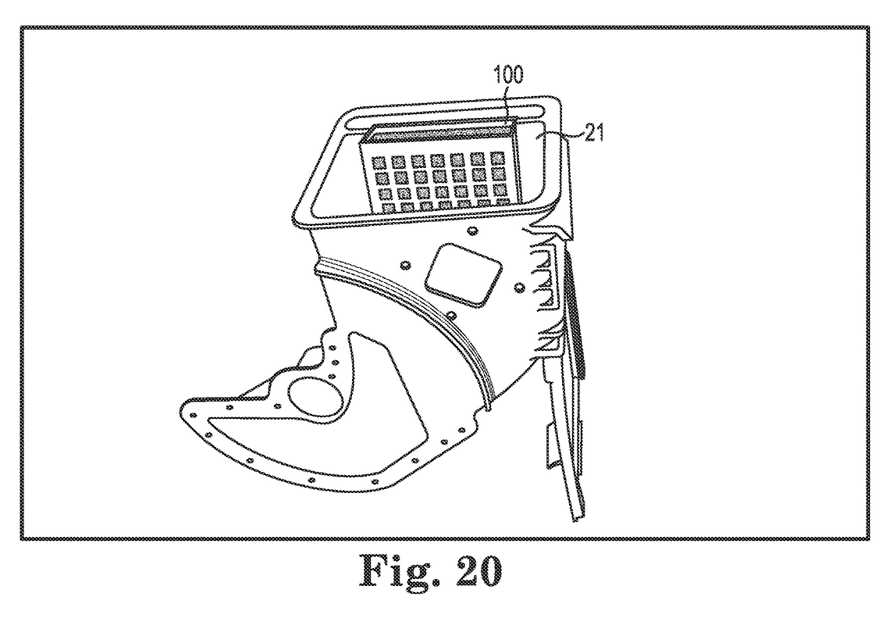
FIG. 20 is a perspective view of the seed hopper of FIG. 18 with a filter cartridge fully disposed in the hopper according to certain embodiments.
Figure 21:
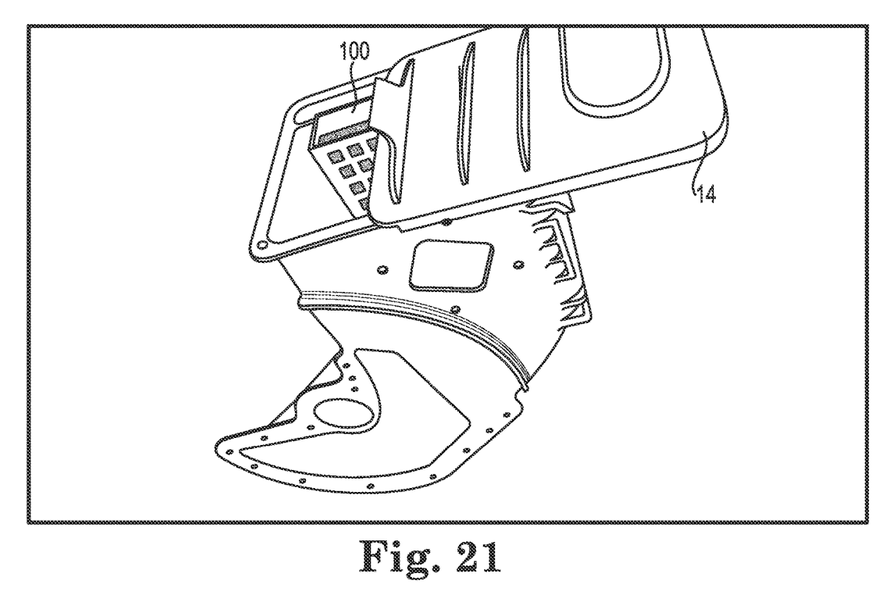
FIG. 21 is a top view of the seed hopper with a filter cartridge of FIG. 20 with the top cover partially replaced according to certain embodiments.
Figure 22:
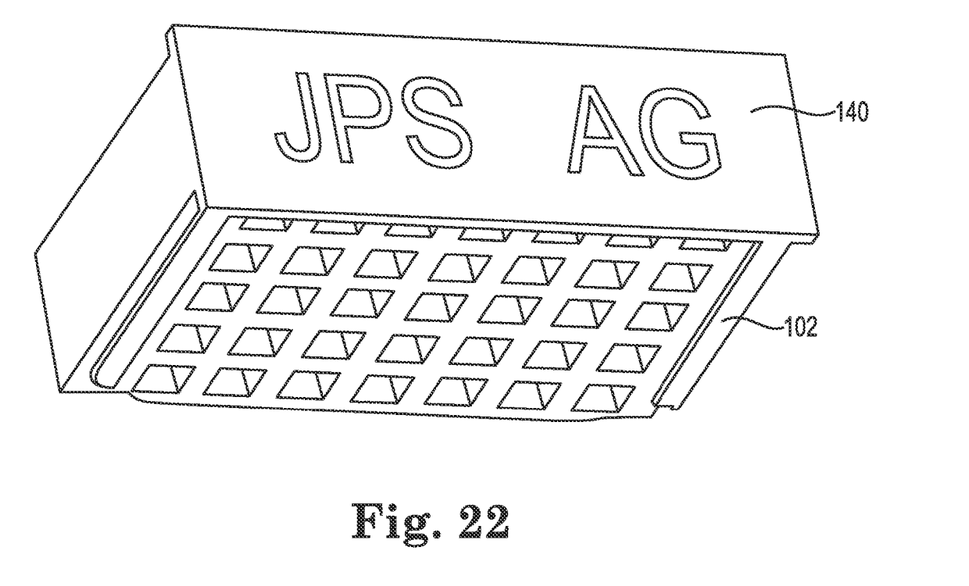
FIG. 22 is a perspective view of a filter cartridge according to certain embodiments.

As can be seen in FIGS. 2 through 4, a film of seed coating material (including neonicotinoids, fungicides, etc.) 22 will typically form all over the seed hopper 12 and the air discharge chute 24. Due to the large number of seed hoppers that a given modern planter may have (e.g. 24 or 36 hoppers) a considerable volume of suspected poisonous material is introduced into the surrounding atmosphere due the particulates of seed coating escaping from the seed hopper 12 on every row of the planter.

There is, thus, a need for a product that greatly reduces the air contamination caused by neonicotinoids/other chemical dust vibrating off seeds, becoming airborne and blowing into the environment.

SUMMARY

Disclosed is an air filtration module for seed planters. The filtration module includes a filter cartridge with a filter media disposed therein. The cartridge is sized and shaped to fit into the stock seed hopper. The filter media is configured to filter out and contain particles of seed coating materials that contain neonicotinoids and/or other contaminates from entering the air. The filter cartridge can replace the porous seed container wall or screen through which compressed air is discharged out the seed hopper air discharge vent.

The disclosure also includes an air filter assembly for seed hoppers of seed planters. The assembly comprises a filter cartridge and a filter media disposed within the interior space of the cartridge. The filter cartridge comprises a front wall defining a plurality of apertures defined therein, a rear wall defining a plurality of apertures defined therein, a first solid end wall spanning between the front wall and the rear wall, a second solid end wall opposing the first solid end wall and spanning between the rear wall and the front wall and a solid bottom side spanning between the front wall, the rear wall, the first solid end and the second solid end. The top end is located opposite the solid bottom side by the intersection of the front wall, the rear wall, the first solid end and the second solid end. The interior space is defined by the intersections of the front wall, the rear wall, the first solid end, the second solid end, the solid bottom side and the top end. A first channel is defined in the first solid end wall which intersects the bottom side and extends towards the top end. A second channel is defined in the second solid end wall which intersects the bottom side and extends towards the top end.

The disclosure further includes an air filter assembly for seed hoppers of seed planters, comprising a filter cartridge and a filter media disposed within the interior space of the filter cartridge. The filter cartridge comprises a bottom surface including a plurality of apertures defined therein, a solid and continuous side wall extending upwardly from the bottom surface around a perimeter of the bottom surface, and a top side defined opposite the bottom surface by the side wall. An interior space is defined by the intersections of the bottom surface, side wall and the top side. A first flange extends outwardly horizontally from a portion of the side wall where the side wall intersects with the top side.

The disclosure also includes a method of reducing neonicotinoid emissions from seed planters. The method comprises removing a top cover of a seed hopper of a seed planter. A filter cartridge is inserted into a portion of the interior of the seed hopper. The cartridge is configured to direct airflow within the hopper through the cartridge. The original airflow in the seed box is not diverted in anyway, it just passes through the cartridge that contains the media. A filter media is inserted within an interior space of the filter cartridge where the airflow within the hopper traverses the filter media. The top cover of the seed hopper is replaced. The seed hopper is operated to plant seeds. Particles of seed coating containing neonicotinoids are captured by the filter media from the airstream within the hopper.

The above summary is not intended to limit the scope of the invention, or describe each embodiment, aspect, implementation, feature or advantage of the invention. The detailed technology and preferred embodiments for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

DETAILED DESCRIPTION

In the following descriptions, the present invention will be explained with reference to various example embodiments. Nevertheless, these example embodiments are not intended to limit the present invention to any specific example, environment, application, or particular implementation described herein. Therefore, descriptions of these example embodiments are only provided for purpose of illustration rather than to limit the present invention. The invention is to cover all modifications, equivalents, and alternatives falling within the scope of the invention as defined by the appended claims. Dimensions and proportions of the various components can be varied without departing from the scope of the invention, unless specifically recited as limiting in a given claim.

This invention reduces the potential harmful environmental impact that neonicotinoid containing particulates, and other particulated substances, have by filtering out the seed coating particulates from the planter's discharge airstream. The invention can be applied to conventional seed planter devices that use an air-driven seed delivery system.

One object and advantage of the present invention is that substantially all seed coating particulates, including the harmful neonicotinoids, are filtered out and contained in the cartridge rather than being discharged into the atmosphere. An object and advantage of certain embodiments is that the filter cartridge can be disposed in existing seed planter apparatuses. An object and advantage of certain embodiments is that a seed box includes a filter cartridge to remove seed coating particulates. Another object and advantage of certain embodiments is that the filter cartridge, or the filter media in the cartridge, is easily replaceable in the field. Another object and advantage of the present invention is that chemicals that are effective for growing crops, but potentially harmful to the environment and wildlife, can continue to be used because the particulates containing the harmful chemicals are not released into the environment. Another objective is to allow growers to maintain their current management practices which is vital because of a shortage of labor in rural America. Finally, the invention helps farmers continue to produce abundant food crops.

Referring to FIGS. 5-9 and 12-16, the filter module 100 comprises a filter housing or cartridge 102 and a filter media 104 disposed in the cartridge. The filter cartridge 102 is configured to fit inside of various shapes and sizes of existing seed hoppers without the need to modify the hopper.

In the embodiment of FIGS. 5-9, the conventional separation screen 18 shown in FIGS. 3-4 is replaced with the filter cartridge 102. In this embodiment, the cartridge 102 generally comprises a rectangular box with an open top side. The front 106 and rear 108 walls define a plurality of apertures 110 therein to permit air to flow into and through the cartridge 102. The end walls 112, 114 and the bottom side 116 are each solid surfaces. An interior space 118 is defined by the front, rear, bottom and end walls.

The filter media 104 is sized and shaped to be disposed within the interior space 118 via the open top side. The open top permits the filter media to be easily accessed and replaced. The top cover of the hopper adequately covers the open top side of the cartridge 102 and media 104 so that the filter media 104 is retained in place. The cartridge 102 can include a retaining lip 119 extending horizontally inward from one or more top edges to help hold the filter media 102 in place.

In alternative embodiments, the top side of the cartridge is permanently closed, or can have a removable cartridge cover. If closed, the entire cartridge is to be swapped out, rather than being able to just change the filter media.

This arrangement of solid walls and apertures as described herein causes the air to flow across the filter media, thereby removing particulates from the air stream. The air exiting the hopper include has been found to achieve a substantial (e.g. 67%) reduction in neonicotinoid containing particles that would otherwise have become airborne without the present invention. The filter media meets ASHARE standards. In certain embodiments, the filter media can be MERV 8 media that satisfies the standard ASHARE 52.2.2007 and is UL rated 900.

In order to secure the cartridge in place within the hopper in this embodiment, the end walls 112, 114 and the bottom side 116 each define a recessed channel 120. The protruding flange 21 inside of the hopper (shown in FIGS. 2-3) that previously held the screen 18 in place is now inserted into the respective portions of the channel 120 of the cartridge 102 as the cartridge is disposed into the hopper with a vertical motion. The screen 18 is no longer used. The hopper top cover 14 is replaced and then the seed planter is ready to be used to plant seeds.

In the embodiment of FIGS. 12-16, the filter cartridge 102 is shaped differently because it is adapted to the particular seed hopper 12 configuration shown. In the previous embodiment, the airflow direction was horizontal. However, in the embodiment of FIGS. 10-16, the airflow is vertical. Here, the top cover 14 of the hopper 12 in FIG. 10 (the lower right rectangular structure) is removed to expose the hopper interior as shown in FIG. 11. The cartridge 102 is set down into the open top of the hopper 12 as shown in FIG. 12 and the filter media 104 is disposed in the cartridge 102 as shown in FIG. 16. Then the normal hopper lid 14 is then put back into place to seal the hopper 12.

The cartridge in this embodiment comprises a bottom surface 122 defining a plurality of apertures 124. The apertures 124 permit the vertical flow of air across the filter media. The four side walls 126, 128, 130, and 132 are solid and define a continuous wall to prevent air from flowing in the horizontal direction. The top side of the cartridge is open. The walls and bottom surface together define an interior region 133 for receiving the filter media.

A first flange 134 extends horizontally from the top edge of one of the side walls to enclose any remaining opening in the top of the hopper so that air cannot flow around the filter media; the air must flow through the filter media. A support rib 136 (or a plurality of support ribs) can run under the flange 134 to provide rigidity or support to the flange 134.

A second flange 138 extends from a top edge of an opposing side wall to engage a top perimeter of the hopper. The first 134 and second 138 flanges maintain the cartridge inside of the hopper in a suspended position adjacent the top cover. Additional suspending flanges can be provided to the other side walls as well. The side wall perimeter shape of the cartridge and the first flange can be configured to conform to the interior shape of the particular hopper into which the cartridge will be installed. Likewise, the filter media 104 can be shaped to fit within the interior 133 of the cartridge 102.

The cartridge can be formed of any suitable material, such as paper, plastic, rubber or metal, or a combination of materials. In one embodiment, the cartridge can be formed of rigid plastic by a molding operation.

When the filter media 104 becomes sufficiently loaded or clogged with seed coating particulates, the whole cartridge 102 (with media 104 still in the cartridge) can be easily replaced in the field by taking out the current cartridge and replacing it with a new cartridge. Alternatively, the filter media itself can be replaced in the field and the cartridge re-used.

Referring now to FIGS. 17-21, another variation of hopper 12 is shown. Like that of FIGS. 2-4, the conventional screen 18 is in a vertical orientation and the airflow is in a horizontal direction across the screen. The replacement filter cartridge assembly 100, comprising the cartridge 102 with media 104 disposed therein, replaces the screen 18, and the hopper 12 is otherwise unaltered.

The top cover 14 of the hopper 12, is removed as shown and the screen 18 is removed by sliding it vertically upwards. Then, the filter assembly 100 is slid downwards vertically with the flanges 21 following the grooves in the cartridge as discussed previously herein. After the cartridge assembly 100 is fully seated in the hopper 12, the cover 14 is secured over the hopper and the seed planter is again ready for use.

FIG. 22 illustrates the additional feature of certain embodiments of the cartridge 102 where a top cover 140 is disposed over the open end of the cartridge 102. The cover 140 ensures that the filter media 104 stays secured within the interior space of the cartridge 102. The cover 140 can be latched on one side and hinged on another, or can be a press-friction fit. The cover can be a card plastic or a softer rubber material with flexibility to snugly conform to the cartridge.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

What is claimed is:

1. An air filter assembly for seed hoppers of seed planters, comprising:
 a filter cartridge, the filter cartridge comprising:
  a front wall, the front wall defining a plurality of apertures defined therein;
  a rear wall, the rear wall defining a plurality of apertures defined therein;
  a first solid end wall spanning between the front wall and the rear wall;
  a second solid end wall opposing the first solid end wall and spanning between the rear wall and the front wall;
  a solid bottom side spanning between the front wall, the rear wall, the first solid end and the second solid end;
  a top end is defined opposite the solid bottom side by the intersection of the front wall, the rear wall, the first solid end and the second solid end; and
  an interior space defined by the intersections of the front wall, the rear wall, the first solid end, the second solid end, the solid bottom side and the top end; and
 a filter media disposed within the interior space,
 wherein a first channel is defined in the first solid end wall which intersects the bottom side and extends towards the top end, and wherein a second channel is defined in the second solid end wall which intersects the bottom side and extends towards the top end.

2. The assembly of claim 1, wherein a third channel is defined in the bottom side which extends across the bottom side and intersects the first channel and the second channel.

3. The assembly of claim 1, wherein the filter media is configured to filter seed coating particulates containing neonicotinoids out of an airstream flowing across the filter media.

4. The assembly of claim 1, further comprising a retaining lip extending horizontally inward from at least one of the intersections of the front wall, the rear wall, the first solid end and the second solid end with the top end.

5. The assembly of claim 1, wherein the cartridge comprises a cover disposed over the top end.

6. The assembly of claim 1, wherein the plurality of apertures in the front wall and the rear wall each have the same shape and size.

7. The assembly of claim 1, wherein the plurality of apertures in the front wall and the rear wall are both arrayed in a grid pattern.

8. An air filter assembly for a seed hopper of a seed planter, comprising:
 a filter cartridge for being disposed within the seed hopper of the seed planter, the filter cartridge comprising:
  a bottom surface, the bottom surface defining a plurality of apertures defined therein;
  a solid and continuous side wall extending upwardly from the bottom surface around a perimeter of the bottom surface;
  a top side defined opposite the bottom surface by the side wall;
  an interior space defined by the intersections of the bottom surface, side wall and the top side; and
  a first flange extending outwardly horizontally from a portion of the side wall where the side wall intersects with the top side; and
 a filter media disposed within the interior space.

9. The assembly of claim 8, wherein the filter media is configured to filter seed coating particulates containing neonicotinoids out of an airstream flowing across the filter media.

10. The assembly of claim 8, wherein the cartridge further comprises a support rib extending away from the side wall and contacting the first flange.

11. The assembly of claim 8, wherein the cartridge further comprises a second flange located opposite the first flange and extending outwardly horizontally from the portion of the side wall where the side wall intersects with the top side.

12. The assembly of claim 8, wherein the filter media meets ASHRAE standards.

13. The assembly of claim 8, wherein the cartridge comprises a cover disposed over the top side.

14. The assembly of claim 8, wherein the plurality of apertures in the bottom surface are each the same shape and size.

15. The assembly of claim 8, wherein the plurality of apertures in the bottom surface are arrayed in a grid pattern.

16. A method of reducing neonicotinoid emissions from seed planters, comprising:
 removing a top cover of a seed hopper of a seed planter;
 inserting a filter cartridge into a portion of the interior of the seed hopper, the cartridge configured to direct airflow within the hopper through the cartridge and through a filter media disposed in the cartridge;
 replacing the top cover of the seed hopper;
 operating the seed hopper to plant seeds; and
 capturing particles of seed coating containing neonicotinoids by the filter media from the airstream within the hopper.

17. The method of claim 16, further comprising removing a separator screen from the seed hopper prior to the step of inserting the filter cartridge.

18. The method of claim 16, further comprising engaging channels defined in the filter cartridge with protruding flanges defined within the seed hopper.

19. The method of claim 16, directing the airflow within the seed hopper through the filter media by blocking a portion of a top opening of the seed hopper.

* * * * *